US011829319B2

(12) United States Patent
Vernekar et al.

(10) Patent No.: US 11,829,319 B2
(45) Date of Patent: Nov. 28, 2023

(54) INTER-INTEGRATED CIRCUIT (I2C) APPARATUS

(71) Applicant: AMS INTERNATIONAL AG, Jona (CH)

(72) Inventors: Sandeep Vernekar, Eindhoven (NL); Vijay Ele, Eindhoven (NL)

(73) Assignee: AMS INTERNATIONAL AG, Jona (CH)

( * ) Notice: Subject to any disclaimer, the term of this patent is extended or adjusted under 35 U.S.C. 154(b) by 3 days.

(21) Appl. No.: 17/613,298

(22) PCT Filed: May 28, 2020

(86) PCT No.: PCT/EP2020/064904
§ 371 (c)(1),
(2) Date: Nov. 22, 2021

(87) PCT Pub. No.: WO2020/239944
PCT Pub. Date: Dec. 3, 2020

(65) Prior Publication Data
US 2022/0309023 A1 Sep. 29, 2022

Related U.S. Application Data

(60) Provisional application No. 62/855,339, filed on May 31, 2019.

(51) Int. Cl.
*G06F 13/42* (2006.01)
*G06F 13/40* (2006.01)
(52) U.S. Cl.
CPC ...... *G06F 13/4291* (2013.01); *G06F 13/4022* (2013.01); *G06F 13/4072* (2013.01)
(58) Field of Classification Search
CPC ............. G06F 13/4291; G06F 13/4022; G06F 13/4072
See application file for complete search history.

(56) References Cited

U.S. PATENT DOCUMENTS 5,376,928 A * 12/1994 Testin ................. G06F 13/4291
710/105
10,817,451 B1 * 10/2020 Tabuchi .............. G06F 13/4022
(Continued)

FOREIGN PATENT DOCUMENTS

CN 101208679 A 6/2008
CN 101208913 A 6/2008
(Continued)

OTHER PUBLICATIONS

International Search Report and Written Opinion for corresponding PCT Patent Application No. PCT/EP2020/064904 dated Jul. 16, 2020.
(Continued)

*Primary Examiner* — Phong H Dang
(74) *Attorney, Agent, or Firm* — TAROLLI, SUNDHEIM, COVELL & TUMMINO L.L.P.

(57) ABSTRACT

An I2C apparatus (100) comprising: a master device (102) and two slave devices connected through an I2C bus, whereby the two slave devices are programmed with the same default device address. A first slave device (108) is connected to the bus in a conventional configuration whereas a second slave device (110) is connected to the bus in a cross connected configuration such that a clock pin of the second slave is connected to the serial data line and the data pin of the second slave is connected to the serial clock line. In response to a detection that the data pin of the second slave is connected to the serial clock line, the second slave swaps the lines going from the clock and data pins to processing logic of the second slave; and modifies its default device address to ensure that each slave device has a unique device address.

15 Claims, 8 Drawing Sheets

(56) References Cited

U.S. PATENT DOCUMENTS

| | | | | |
|---|---|---|---|---|
| 2008/0098147 A1* | 4/2008 | Amano | ............... | G06F 13/4045 |
| | | | | 710/300 |
| 2012/0191889 A1* | 7/2012 | Fischer | ............... | G06F 13/4291 |
| | | | | 710/110 |
| 2014/0281080 A1* | 9/2014 | Eddleman | ........... | G06F 13/4291 |
| | | | | 710/110 |
| 2015/0286606 A1 | 10/2015 | Sengoku | | |
| 2016/0147708 A1* | 5/2016 | Freudenberger | .... | G06F 13/4291 |
| | | | | 710/110 |
| 2018/0150424 A1 | 5/2018 | Miluzzi et al. | | |
| 2020/0356511 A1* | 11/2020 | Sekiya | ................ | G06F 13/4022 |

FOREIGN PATENT DOCUMENTS

| | | |
|---|---|---|
| CN | 101213535 A | 7/2008 |
| CN | 102023954 A | 4/2011 |
| CN | 106155971 A | 11/2016 |
| CN | 107209811 A | 9/2017 |
| CN | 109213718 A | 1/2019 |
| CN | 208834297 U | 5/2019 |
| GB | 2537856 A | 11/2016 |
| TW | 201711389 A | 3/2017 |
| WO | 2012170921 A2 | 12/2012 |

OTHER PUBLICATIONS

Taiwanese application No. 109118124; Taiwanese Office Action dated May 29, 2023.
CN Application No. 202080040340.0; Chinese Office Action with Search Report dated Jul. 19, 2023, pp. 1-9.

* cited by examiner

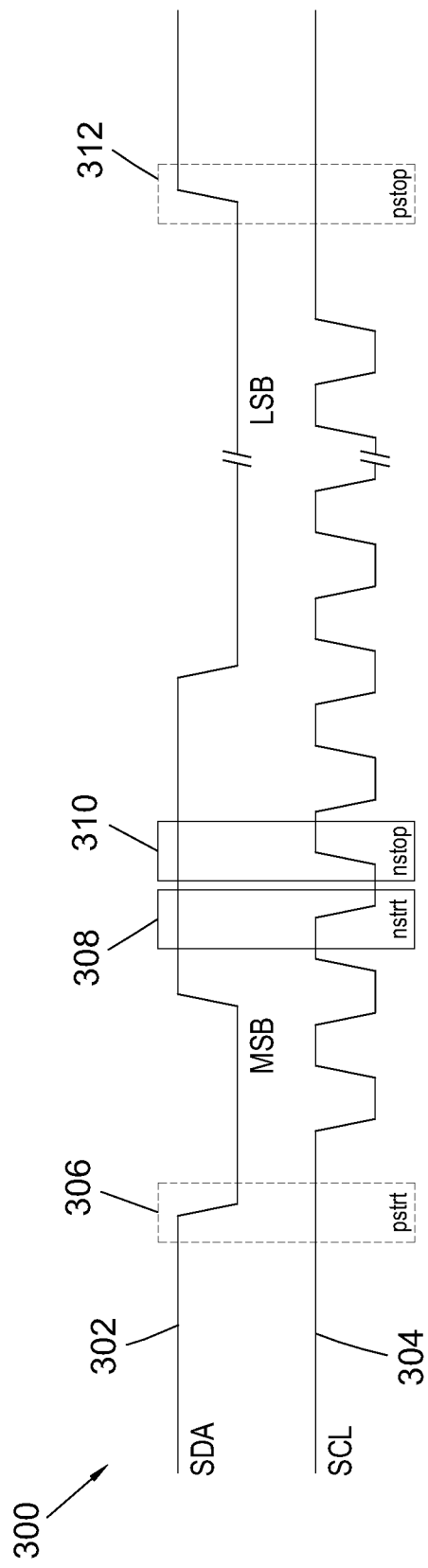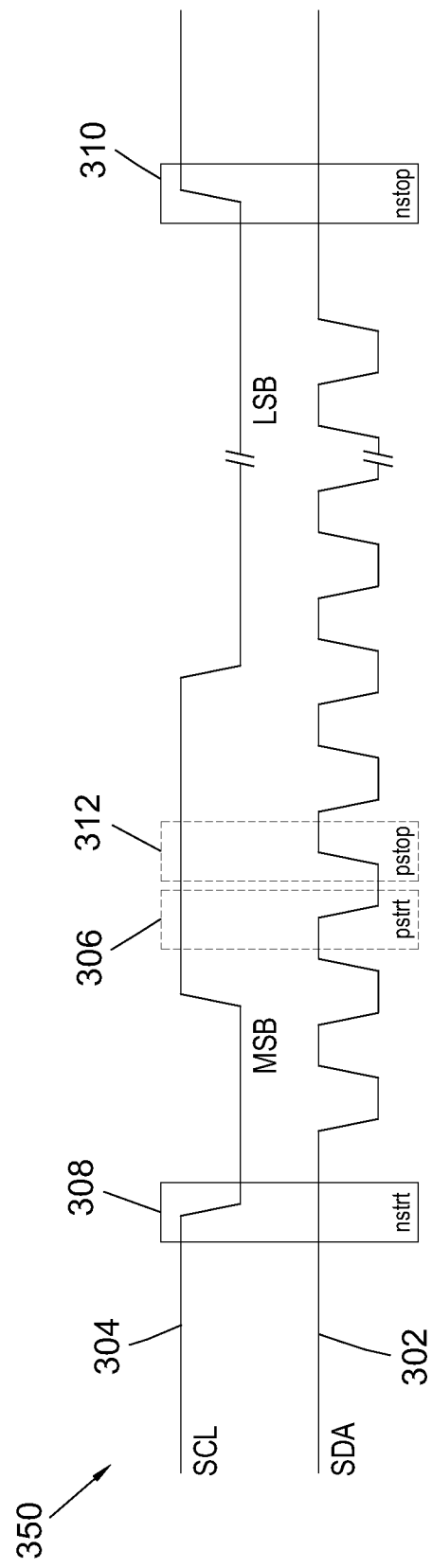

INTER-INTEGRATED CIRCUIT (I2C) APPARATUS

RELATED APPLICATIONS

The present invention is a U.S. National Stage under 35 USC 371 patent application, claiming priority to Serial No. PCT/EP2020/064904, filed on 28 May 2020; which claims priority from U.S. Provisional Application No. 62/855,339 filed 31 May 2019, the entirety of both of which are incorporated herein by reference.

FIELD OF THE DISCLOSURE

This disclosure relates to an Inter-Integrated Circuit (I2C) apparatus.

BACKGROUND

In an I2C bus network, all the slave devices connected to the I2C bus should have a unique address to be communicated by the master device. In the I2C protocol, no provision is provided for successful communication if two slave devices having the same address are connected to the I2C bus. In this case, there is a possibility of bus contention because of the ACK phase of the I2C protocol.

To overcome this protocol level problem, one known solution is to use an extra pin on each slave device which is either connected to a power rail or ground to configure the slave device in dependence on its connection to the I2C bus.

Another solution is to employ multiplexer circuitry which is external to the two slave devices to ensure only one of the two slave devices is coupled to the I2C bus at any one time.

Another solution is for manufacturers to provide multiple part numbers for a part, the only difference being its I2C address.

SUMMARY

The inventors have identified that known solutions for connecting multiple instances of the same slave device to an I2C bus are problematic in that they (i) require the use of extra pins on the slave devices; (ii) require additional components in the I2C bus network; or (iii) complicate the manufacturing process.

According to one aspect of the present disclosure there is provided an Inter-Integrated Circuit, I2C, apparatus comprising: an I2C master device; and a first I2C slave device communicably connected with the master device through an I2C bus comprising a serial clock line and a serial data line, wherein a clock pin of the first slave device is connected to the serial clock line and a data pin of the first slave device is connected to the serial data line; a second I2C slave device communicably connected with the master device through the I2C bus, wherein a clock pin of the second I2C slave device is connected to the serial data line and the data pin of the second I2C slave device is connected to the serial clock line; wherein an address value programmed into the first I2C slave device is the same as an address value programmed into the second I2C slave device; wherein the second I2C slave device comprises: processing logic comprising a clock input port, a data input port and a data output port; a clock line identification module configured to detect whether the clock pin or the data pin of the second 120 slave device is connected to the serial clock line; and a control module configured, in response to a detection that the data pin is connected to the serial clock line, to: control coupling of the data pin of the second I2C slave device to the clock input port of said processing logic; control coupling the clock pin of the second I2C slave device to the data input port of said processing logic and a data output port of said processing logic; and configure a device address for the second I2C slave device by modifying the address value programmed into the second I2C slave device.

Advantageously in embodiments of the present disclosure two slave devices programmed with the same default device address (e.g. multiple instances of the same slave device) can be connected to the same I2C bus without any external components. Furthermore the manufacturing of instances of the slave device is simplified as all of the instances of the same slave device can be programmed with the same default device address. This is because when the second I2C slave device is in a "cross connected" configuration (whereby a clock pin of the second I2C slave device is connected to the serial data line and the data pin of the second I2C slave device is connected to the serial clock line) it will detect its connection to the I2C bus, swap the lines going from its pins to the processing logic, and modify its default address to ensure that each I2C slave device has a unique device address in compliance with the I2C protocol.

In implementations, the control module is configured, in response to a detection that the clock pin of the second I2C slave device is connected to the serial clock line, to: maintain coupling of the clock pin of the second I2C slave device to the clock input port of said processing logic; maintain coupling of the data pin of the second I2C slave device to the data input port of said processing logic and a data output port of said processing logic; and retain the address value programmed into the second I2C slave device as a device address for the second I2C slave device.

In implementations, the clock line identification module comprises: a first edge counter configured to count edges of a signal received via the clock pin of the second I2C device; and a second edge counter configured to count edges of a signal received via the data pin of the second I2C device; wherein once a summation of a first count by the first edge counter and a second count by the second edge counter exceeds a predetermined threshold count, the clock line identification module is configured to detect whether the clock pin or the data pin of the second I2C device is connected to the serial clock line by comparing the first count and the second count.

In implementations, the clock line identification module is configured to: detect that the data pin of the second I2C device is connected to the serial clock line based on the second count exceeding the first count; and detect that the clock pin of the second I2C device is connected to the serial clock line based on the first count exceeding the second count.

In implementations, the second I2C slave device further comprises: a multiplexer stage coupling said clock pin and said data pin of the second I2C device to the processing logic, wherein the control module is configured to generate and transmit a switch signal to the multiplexer stage to control the coupling of the data pin and clock pin of the I2C slave device to the processing logic, the switch signal having a value dependent on whether the clock pin or the data pin of the device is connected to the serial clock line.

In implementations, in response to a detection that the clock pin of the second I2C device is connected to the serial clock line, the control module is configured to generate and transmit the switch signal having a first value to configure the multiplexer stage so that the clock pin of the second I2C device is coupled to the clock input port of said processing logic and the data pin of the second I2C device is coupled to the data input port and the data output port of said processing logic.

In implementations, in response to the detection that the data pin of the second I2C device is connected to the serial clock line, the control module is configured to generate and transmit the switch signal having a second value to configure the multiplexer stage so that the data pin of the second I2C device is coupled to the clock input port of said processing logic and the clock pin of the second I2C device is coupled to the data input port and the data output port of said processing logic.

In implementations, the control module is configured to detect that the I2C bus is idle and generate and transmit said switch signal having the second value in response to detecting that the I2C bus is idle. This advantageously ensures that the signal swapping is only performed when the I2C bus is idle and not during an I2C transaction.

When the data pin of the second I2C device is connected to the serial clock line the control module may be configured to detect that the I2C bus is idle by detecting a transition of the signal received via the clock pin from a logic low value to a logic high value whilst the signal received via the data pin is at logic high value.

When the clock pin of the second I2C device is connected to the serial clock line the control module may be configured to detect that the I2C bus is idle by detecting a transition of the signal received via the data pin from a logic low value to a logic high value whilst the signal received via the clock pin is at logic high value.

In some implementations, the control module is configured to: generate a switching completion signal; and transmit the switching completion signal to the multiplexer stage, wherein the multiplexer stage is configurable in response to both the switch signal and the switching completion signal. In these implementations, after power up one I2C transaction is required for both I2C slave device instances to start responding to I2C transactions from an I2C master device with their respective addresses. In these implementations, advantageously there is no risk of any timing failure or misbehaviour of I2C protocol slave logic. In these implementations, the multiplexer stage may be arranged such that when the switching completion signal has a first value, the switch signal is prevented from configuring the multiplexer stage, and when the switching completion signal has a second value, the switch signal is able to configure the multiplexer stage. In these implementations, the multiplexer stage may tie the clock input port, data input port, and data output port to a default logic high value until the switching completion signal has said second value which allows the switch signal to configure the multiplexer stage.

In other implementations, the multiplexer stage is configured in response to only the switch signal. In these implementations, the design and manufacture of the I2C slave device is simplified because less components are used in the control module and the multiplexer stage. In these implementations, the processing logic should be designed to take care of timing violations.

The control module may modify the address value by incrementing or decrementing the address value.

In implementations, the address value programmed into the first I2C slave device is the same as the address value programmed into the second I2C slave device.

According to another aspect of the disclosure there is provided an Inter-Integrated Circuit (I2C) slave device comprising: a clock pin and a data pin for coupling to an I2C bus for communication with an I2C master device, the I2C bus comprising a serial clock line and a serial data line; processing logic comprising a clock input port, a data input port and a data output port; a clock line identification module configured to detect whether the clock pin or the data pin is connected to the serial clock line; and a control module configured, in response to a detection that the data pin is connected to the serial clock line, to: control coupling of the data pin to the clock input port of said processing logic; control coupling the clock pin to the data input port of said processing logic and a data output port of said processing logic; and configure a device address for the I2C slave device by modifying an address value programmed into the I2C slave device.

According to another aspect of the disclosure there is provided a computer implemented method performed on an Inter-Integrated Circuit (I2C) slave device comprising a clock pin and a data pin for coupling to an I2C bus for communication with an I2C master device, the I2C bus comprising a serial clock line and a serial data line; and processing logic comprising a clock input port, a data input port and a data output port, wherein the computer implemented method comprises: detecting whether the clock pin or the data pin is connected to the serial clock line; and in response to a detection that the data pin is connected to the serial clock line, the method further comprising: controlling coupling of the data pin to the clock input port of said processing logic; controlling coupling the clock pin to the data input port of said processing logic and a data output port of said processing logic; and configuring a device address for the 120 slave device by modifying an address value programmed into the I2C slave device.

According to another aspect of the disclosure there is provided a computer-readable storage medium comprising instructions which, when executed by a processor of a computing device cause the computing device to perform any of the methods described herein.

The instructions may be provided on a carrier such as a disk, CD- or DVD-ROM, programmed memory such as read-only memory (Firmware), or on a data carrier such as an optical or electrical signal carrier. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE PREFERRED EMBODIMENTS

Some embodiments of the disclosure will now be described by way of example only and with reference to the accompanying drawings, in which:

FIG. 3a illustrates an I2C transaction seen by pins of a slave device connected to an I2C bus in a conventional configuration;

FIG. 3b illustrates the same I2C transaction seen by pins of a slave device connected to an I2C bus in a cross connected configuration;

It should be appreciated that like reference numerals are used to identify like elements illustrated in one or more of the figures.

DETAILED DESCRIPTION OF THE PREFERRED EMBODIMENTS

Generally speaking, the disclosure enables two slave devices programmed with the same default device address (e.g. multiple instances of the same slave device) to be connected the same I2C bus without any external components Some examples of the solution are given in the accompanying figures.

Figure 1:
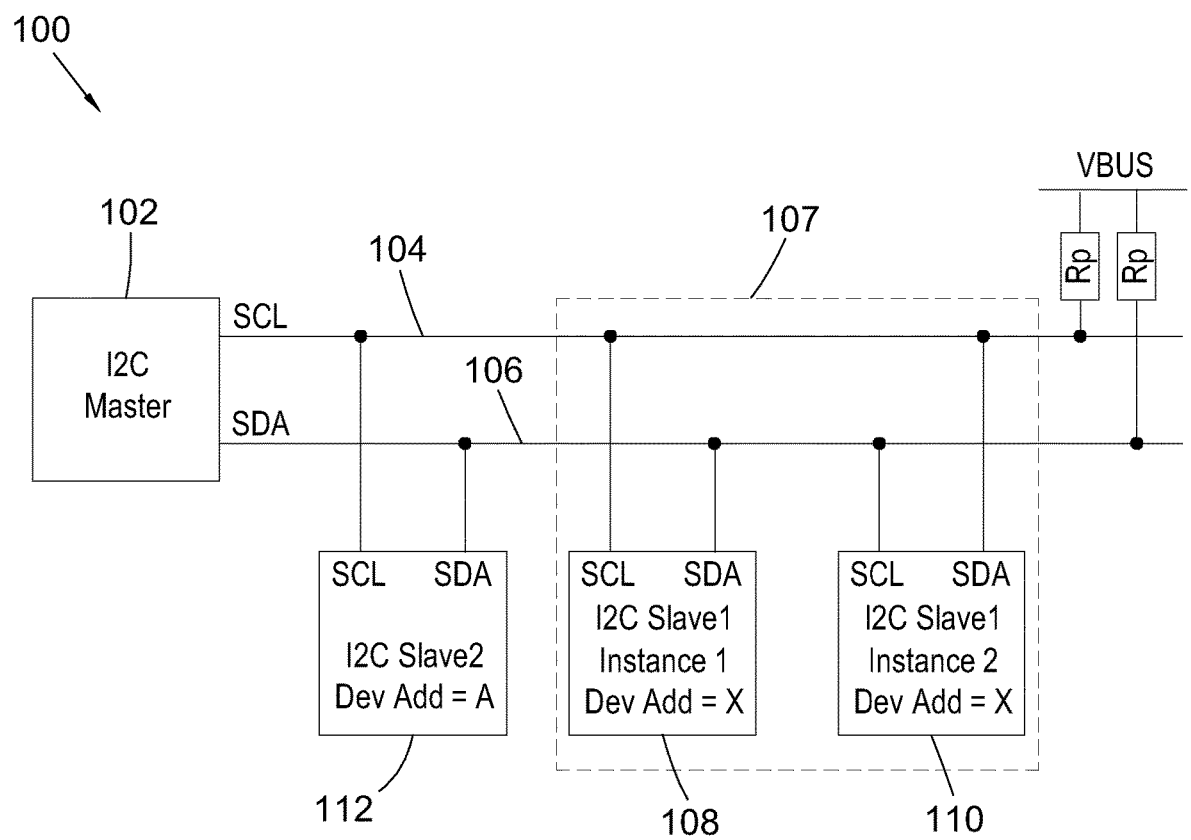
FIG. 1 illustrates a schematic block diagram of an Inter-Integrated Circuit (I2C) apparatus before an I2C transaction according to embodiments of the present disclosure.

FIG. 1 illustrates an Inter-Integrated Circuit (I2C) apparatus 100. The I2C apparatus comprises an I2C master device 102 connected to an I2C bus. The I2C master device 102 may for example be a microprocessor or microcontroller. The I2C bus is a bi-directional two-wire serial bus comprising a serial clock line (SCL) 104 for sending clock pulses and a serial data line (SDA) 106 for serially sending data.

In embodiments of the present disclosure, the slave device arrangement 107 is coupled to the I2C bus. The slave device arrangement 107 comprises two I2C slave devices.

As shown in FIG. 1, the slave device arrangement 107 comprises a first I2C slave device 108 communicably connected with the I2C master device 102 through the I2C bus. The first I2C slave device 108 is connected to the I2C bus in a conventional configuration whereby a clock pin (SCL) of the first I2C slave device 108 is connected to the serial clock line 104 and a data pin (SDA) of the first I2C slave device 108 is connected to the serial data line 106.

The slave device arrangement 107 further comprises a second I2C slave device 110 communicably connected with the I2C master device 102 through the I2C bus. The clock pin (SCL) of the second I2C slave device 110 is connected to the serial data line 106 and a data pin (SDA) of the second I2C slave device 110 is connected to the serial clock line 104. We refer to this configuration herein as a "cross connected" configuration.

A 'pin' of a slave device is also referred to herein as a 'pad'.

FIG. 1 illustrates the device address of the first I2C slave device 108 and the second 120 slave device 110 before any I2C transaction on the I2C bus. As shown in FIG. 1, an address value (X) programmed into the first I2C slave device 108 is the same as an address value (X) programmed into the second I2C slave device 110 at manufacture. One or both of the first 120 slave device 108 and the second I2C slave device 110 may be a sensor device (e.g. a proximity sensor, an accelerometer, a gyroscope, a temperature sensor, a magnetometer, a light sensor etc.). However embodiments of the present disclosure are not limited to either of the first I2C slave device 108 and the second I2C slave device 110 being sensor devices.

In some embodiments, the first I2C slave device 108 and the second I2C slave device 110 are two instances of the same slave device (i.e. they have the same part number). This is shown in FIG. 1. For example, in the context of earbud applications, there is a requirement of two proximity device instances being connected to the same I2C bus. In the earbud example, a single earbud comprises the apparatus 100 shown in FIG. 1.

A device incorporates the I2C apparatus 100. The device is not limited to being an earbud. The device may for example be a mobile telephone, tablet or other mobile computing device. The device may for example be a wearable device (e.g., smartwatch or head-mounted device, such as smart glasses).

One or more additional slave devices having different address values than the slaves devices of the slave device arrangement 107 may also be coupled to the I2C bus. For example, FIG. 1 illustrates an additional slave device (I2C Slave2) 112 which has an address value (A) programmed into it.

According to the I2C protocol, each slave device connected to the I2C bus must have a unique address. Functionality of the second I2C slave device 110 described herein addresses this.

Figure 2:
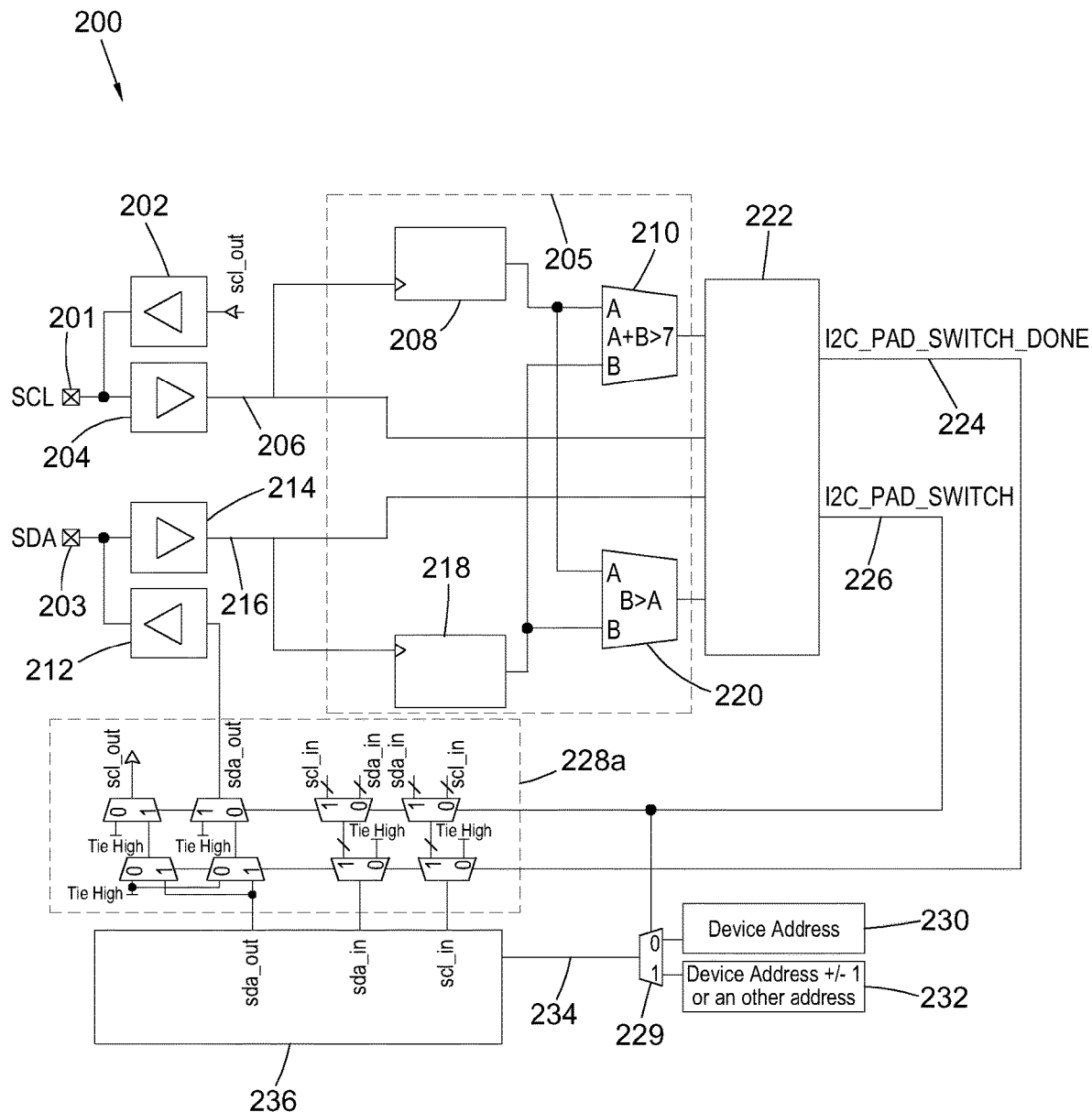
FIG. 2 illustrates a slave device according to a first embodiment of the present disclosure.

FIG. 2 illustrates an example slave device 200 according to a first configuration. With reference to FIG. 1, the second I2C slave device 110 has functionality of the slave device 200 described below. The first I2C slave device 108 may also have the functionality of the slave device 200 described below.

As shown in FIG. 2 the slave device 200 has a clock pin (SCL) 201 and a data pin (SDA) 203.

The clock pin 201 is coupled to a SCL output driver circuit 202 and a SCL pad delay and filter circuit 204. The SCL output driver circuit 202 converts logical 0/1 values from I2C protocol slave logic 236 to an I2C defined voltage level on the I2C bus. The SCL pad delay and filter circuit 204 operates in the reverse, converting the I2C bus voltage to internal logic levels of 0/1. The SCL pad delay and filter circuit 204 may perform filtering to suppress any voltage glitches on the I2C bus and/or introduce a delay to signal transition. An output signal for transmission via the clock pin 201 (scl_out) is passed through the SCL output driver circuit 202 before being output onto the I2C bus via the clock pin 201. An input signal received via the clock pin 201 (scl_in) is passed through the SCL pad delay and filter circuit 204 and is output on connection 206 to a clock line identification module 205 and a pad switch control module 222.

The data pin 203 is coupled to a SDA output driver circuit 212 and a SDA pad delay and filter circuit 214. The SDA output driver circuit 212 converts logical 0/1 values from I2C protocol slave logic 236 to an I2C defined voltage level on the I2C bus. The SDA pad delay and filter circuit 214 operates in the reverse, converting the I2C bus voltage to internal logic levels of 0/1. The SDA pad delay and filter circuit 214 may perform filtering to suppress any voltage glitches on the I2C bus and/or introduce a delay to signal transition. An output signal for transmission via the data pin 203 (sda_out) is passed through the SDA output driver circuit 212 before being output onto the I2C bus via the data pin 203. An input signal received via the data pin (sda_in) is passed through the SDA pad delay and filter circuit 214 and is output on connection 216 to the clock line identification module 205 and the pad switch control module 222.

The clock line identification module 205 configured to detect whether the clock pin or the data pin of the slave device is connected to the serial clock line 104. The clock line identification module 205 may be implemented in various ways. One example implementation is shown in FIG. 2.

As shown in FIG. 2, the clock line identification module 205 comprises a first edge counter 208 that receives the scl_in signal on connection 206 as an input. The first edge counter 208 is configured to count edges of the signal (scl_in) received via the clock pin 201. The first edge counter 208 may for example be a positive edge counter.

The clock line identification module 205 also comprises a second edge counter 218 that receives the sda_in signal on connection 216 as an input. The second edge counter 218 is configured to count edges of the signal (sda_in) received via the data pin 203. The second edge counter 218 may for example be a positive edge counter.

The output of the first edge counter 208 is coupled as an input to an adder and comparator 210 (see input 'A'). The output of the second edge counter 218 is also coupled as an input to the adder and comparator 210 (see input 'B').

An adder and comparator 210 is used to sum the count A obtained by the first edge counter 208 and a count B obtained by the second edge counter 218 and provide a logical high value as an output to the pad switch control module 222 when this summation exceeds a predetermined threshold count. Until this condition is met, the adder and comparator 210 outputs a logical low value to the pad switch control module 222. The predetermined threshold count may for example be set to (at least) two counts (i.e. as a minimum requiring the summation to equal three counts). In one example, the predetermined threshold count is set at seven counts (requiring the summation to equal eight counts).

The output of the first edge counter 208 is also coupled as an input to a comparator 220 (see input 'A'). The output of the second edge counter 218 is also coupled as an input to the comparator 220 (see input 'B').

The comparator 220 compares the count A obtained by the first edge counter 208 and the count B obtained by the second edge counter 218 and determines whether the count B obtained by the second edge counter 218 is greater than the count A obtained by the first edge counter 208.

The serial clock line 104 toggles faster than the serial data line 106. Thus if the clock pin 201 is connected to the serial clock line 104 (i.e. the slave device is coupled to the I2C bus in the conventional configuration) then the count A obtained by the first edge counter 208 will be greater than the count B obtained by the second edge counter 218, and the comparator 220 will output a logical low value to the pad switch control module 222. In this scenario, the input signal received via the clock pin 201 (scl_in) will be an input clock signal, the input signal received via the data pin 203 (sda_in) will be an input data signal, furthermore a data output signal for transmission from the slave device to the I2C master device 102 should be transmitted via the data pin 203.

In contrast, if the data pin 203 is connected to the serial clock line 104 (i.e. the slave device is coupled to the I2C bus in the cross connected configuration) then the count B obtained by the second edge counter 218 will be greater than the count A obtained by the first edge counter 208 and the comparator 220 will output a logical high value to the pad switch control module 222. In this scenario, the input signal received via the clock pin 201 (scl_in) will be an input data signal, the input signal received via the data pin 203 (sda_in) will be an input clock signal, furthermore a data output signal for transmission from the slave device to the I2C master device 102 should be transmitted via the clock pin 201.

As shown in FIG. 2 the pad switch control module 222 is arranged to receive as inputs the output of the adder and comparator 210, the scl_in signal on connection 206, the sda_in signal on connection 216, and the output of the comparator 220.

The pad switch control module 222 is configured to control connections between the clock pin 201 and I2C protocol slave logic 236. The pad switch control module 222 is also configured to control connections between the data pin 203 and I2C protocol slave logic 236. The I2C protocol slave logic 236 is configured to process data received from, and for transmission to, the I2C master device 102. The I2C protocol slave logic 236 is arranged to provide a data output signal (sda_out) from a data output port of the I2C protocol slave logic 236 for transmission to the I2C master device 102 through the I2C bus. The I2C protocol slave logic 236 additionally comprises a data input port (sda_in) for receiving data transmitted from the 120 master device 102 and a clock input port (scl_in) for receiving a clock signal transmitted from the I2C master device 102.

In the example slave device 200, the pad switch control module 222 is configured to control the respective connections between the clock pin 201 and data pin 203 to the I2C protocol slave logic 236 by generating a switch signal (I2C_PAD_SWITCH) which is output on connection 226, and by generating a switching completion signal (I2C_PAD_SWITCH_DONE) which is output on connection 224.

The pad switch control module 222 outputs the switch signal (I2C_PAD_SWITCH) and the switching completion signal (I2C_PAD_SWITCH_DONE) to a multiplexer stage 228a to control the coupling of the clock pin 201 and the data pin 203 of the slave device to the I2C protocol slave logic 236.

In operation, in response to a detection by the clock line identification module 205 that the data pin 203 is connected to the serial clock line 104 (i.e. the slave device is connected to the I2C bus in the cross connected configuration), the pad switch control module 222 is configured to: (i) control coupling of the data pin 203 to the clock input port (scl_in) of the I2C protocol slave logic 236 such that the input clock signal received via the data pin 203 is supplied to the clock input port (scl_in) of the I2C protocol slave logic 236; and (ii) control coupling of the clock pin 201 to the data input port (sda_in) of the I2C protocol slave logic 236 and the data output port of the I2C protocol slave logic 236 such that an input data signal received via the clock pin 201 is supplied to the data input port of the I2C protocol slave logic 236 and a data signal output by the I2C protocol slave logic 236 for transmission to the I2C master device 102 is transmitted via the clock pin 201.

That is, based on the clock line identification, the process swaps the lines going from the pins to the I2C protocol slave logic 236. That means that if the data pin 203 is connected to serial dock line 104, then pad switch control module 222 will swap the pin outputs going to the I2C protocol slave logic 236 as inputs, and the sda_out signal from the I2C protocol slave logic will be connected to the SCL output driver circuit 202.

In operation, in response to a detection by the clock line identification module 205 that the clock pin 201 is connected to the serial clock line 104 (i.e. the slave device is connected to the I2C bus in the conventional configuration), the pad switch control module 222 is configured to: maintain coupling of the clock pin 201 to the clock input port of the I2C protocol slave logic 236 such that the input clock signal received via the clock pin 201 is supplied to the clock input port (scl_in) of the I2C protocol slave logic 236; and (ii) maintain coupling of the data pin 203 to the data input port of the I2C protocol slave logic 236 and the data output port of the I2C protocol slave logic 236 such that an input data signal received via the data pin 203 is supplied to the data input port of the I2C protocol slave logic 236 and a data signal output by the I2C protocol slave logic 236 for transmission to the I2C master device 102 is transmitted via the data pin 203.

The functionality of the pad switch control module 222 and the multiplexer stage 228a implemented in the example slave device 200 according the first configuration is described in more detail below with reference to FIGS. 4a and 4b.

We first refer to FIG. 3a which illustrates an I2C transaction 300 seen by pins of a slave device connected to the I2C bus in a conventional configuration, and FIG. 3b which illustrates the same I2C transaction 350 seen by pins of a slave device connected to an I2C bus in a cross connected configuration.

As per the I2C protocol, each I2C transaction initiated by a master device starts with a START condition and ends with a STOP condition.

As shown in FIG. 3a, as per the I2C protocol, in an I2C transaction 300 when the slave device is connected to the I2C bus in a conventional configuration, if the signal 302 received on the data pin 203 SDA (which in the conventional configuration will be from the serial data line 106) goes from low to high (posedge) when the signal 304 received on the clock pin 201 SCL is high (which in the conventional configuration will be from the serial clock line 104) it is called a STOP condition. In the present disclosure it is called pstop (positive stop) 312.

For completeness it is noted that in the conventional configuration, if the signal 302 received on the data pin 203 SDA (which in the conventional configuration will be from the serial data line 106) goes from high to low (negedge) when the signal 304 received on the clock pin 201 SCL is high (which in the conventional configuration will be from the serial clock line 104) it is called a START condition. In the present disclosure it is called pstart (positive start) 306.

As shown in FIG. 3b, when the slave device is connected to the I2C bus in a cross connected configuration, the same STOP condition is detected if the signal received on the clock pin 201 SCL (which in the cross connected configuration will be from the serial data line 106) goes from low to high (posedge) when the signal 302 received on the data pin 203 SDA is high (which in the cross connected configuration will be from the clock line 104) and it is called nstop (negative stop) 310.

For completeness it is noted that in the cross connected configuration, the same START condition is detected if the signal received on the clock pin 201 SCL (which in the cross connected configuration will be from the serial data line 106) goes from high to low (negedge) when the signal 302 received on the data pin 203 SDA is high (which in the cross connected configuration will be from the clock line 104) and it is called nstart (negative start) 308.

It is noted that the pstop condition is detected only once in one I2C transaction in the conventional configuration (i.e. if pad connections are proper: SCL→SCL bus, SDA→SDA bus) and similarly the nstop condition is detected only once in one I2C transaction in the cross connected configuration (i.e. if pad connections are swapped: SCL→SDA bus, SDA→SCL bus). After a pstop or nstop event the I2C bus will be idle for a protocol specified period of time and it is advantageous for any internal pad swapping to be done whilst the I2C bus is idle.

Figure 4A:
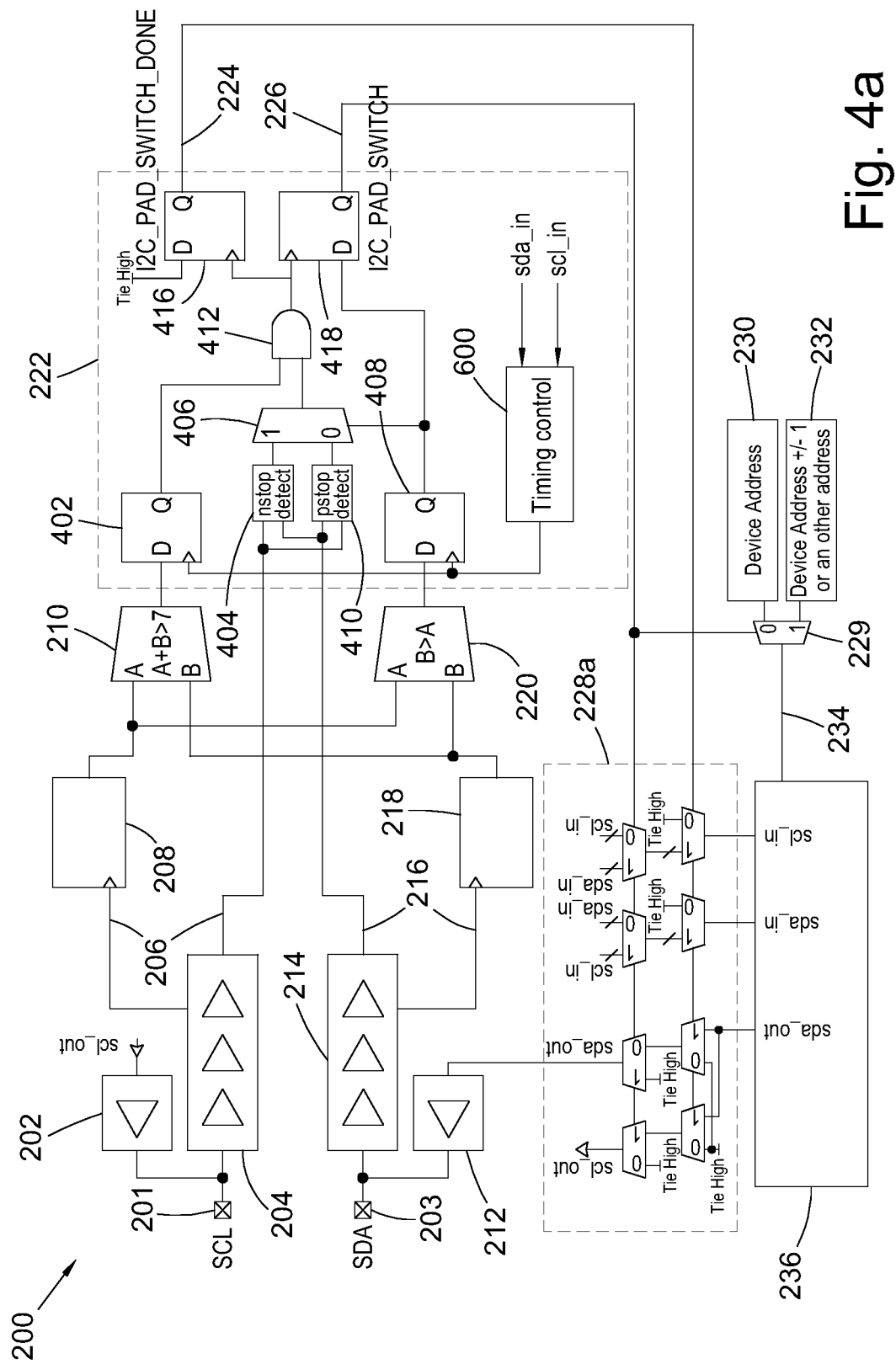
FIG. 4a illustrates a pad switch control module of the slave device according to the first embodiment of the present disclosure.

FIG. 4a illustrates one example arrangement of the pad switch control module 222.

As shown in FIG. 4a, the pad switch control module 222 comprises a first flip-flop 402 (shown as a D flip-flop) and a second flip-flop 408 (shown as a D flip-flop). The output of the adder and comparator 210 is coupled to an input of the first r flip-flop 402. The output of the comparator 220 is coupled to an input of the second flip-flop 408. Both of the first flip-flop 402 and the second flip-flop 408 are driven by the same clock signal which may be provided by timing logic 600 (described in more detail later).

The pad switch control module 222 comprises an nstop detection block 404 which receives as inputs the input signal received via the clock pin 201 on connection 206 and the input signal received via the data pin 203 on connection 216. The nstop detection block 404 is configured to output a logical high value upon detecting the nstop condition described above. Until, the nstop condition is detected, the nstop detection block 404 is configured to output a logical low value.

The pad switch control module 222 also comprises a pstop detection block 410 which receives as inputs the input signal received via the clock pin 201 on connection 206 and the input signal received via the data pin 203 on connection 216. The pstop detection block 410 is configured to output a logical high value upon detecting the pstop condition described above. Until, the pstop condition is detected, the pstop detection block 404 is configured to output a logical low value.

The output of the nstop detection block 404 is coupled to a multiplexer 406. The multiplexer 406 also receives the output of the pstop detection block 410 as an input. The output of the second flip-flop 408 is provided as a control input to the multiplexer 406. When the output of the second flip-flop 408 is low, the multiplexer 406 is configured to provide the output of the pstop detection block 410 as an output of the multiplexer 406. When the output of the second flip-flop 408 is high, the multiplexer 406 is configured to provide the output of the nstop detection block 404 as an output of the multiplexer 406.

An AND gate 412 receives as a first input, the output of the first flip-flop 402. The AND gate 412 receives as a second input, the output of the multiplexer 406. The output of the AND gate 412 is provided as a clock signal to both of a third flip-flop 416 (shown as a D flip-flop) and a fourth flip-flop 418 (shown as a D flip-flop). The data input of the third flip-flop 416 is tied high. The third flip-flop 416 provides the switching completion signal (I2C_PAD_SWITCH_DONE) which is output on connection 224. The output of the second flip-flop 408 is supplied to the data input of the fourth flip-flop 418. The fourth flip-flop 418 provides the switch signal (I2C_PAD_SWITCH) which is output on connection 226

The operation of the pad switch control module 222 will first be described with reference to when the slave device 200 is connected to the I2C bus in a conventional configuration, for example when the first I2C slave device 108 has the functionality of the slave device 200.

On power-up of the slave device 200 the switching completion signal (I2C_PAD_SWITCH_DONE) and the switch signal (I2C_PAD_SWITCH) have a low value.

The adder and comparator 210 will sum the count A obtained by the first edge counter 208 and a count B obtained by the second edge counter 218 and provide a logical high value as an output to the first flip-flop 402 when this summation exceeds a predetermined threshold count.

The serial clock line 104 toggles faster than the serial data line 106. Thus when the slave device 200 is connected to the I2C bus in the conventional configuration, then the count A obtained by the first edge counter 208 will be greater than the count B obtained by the second edge counter 218, and the comparator 220 will output a logical low value to the second flip-flop 408. The second flip-flop 408 will therefore output a logical low value.

As noted above, the output of the second flip-flop 408 is provided as a control input to the multiplexer 406. In particular, when the output of the second flip-flop 408 is low, the multiplexer 406 is configured to provide the output of the pstop detection block 410 as an output of the multiplexer 406.

When the pstop detection block 410 detects the pstop condition described above. The output of the multiplexer 406 will transition from a low to high value which is provided to the second input of the AND gate 412.

The first input of the AND gate 412 will also have a high value because of the first flip-flop 402 outputting a high value once the summation of the counts exceed the predetermined threshold count. Thus when the pstop condition is detected, the output of the AND gate 412 which is provided as a clock signal to both of the third flip-flop 416 (shown as a D flip-flop) and the fourth flip-flop 418 (shown as a D flip-flop) transitions from a low to high value. This causes the value of the switching completion signal (I2C_PAD_SWITCH_DONE) to transition from a low to high value. The switch signal (I2C_PAD_SWITCH) remains having a low value due to the fact that the low output of the second flip-flop 408 is supplied to the data input of the fourth flip-flop 418.

As will be described in more detail with reference to FIG. 4b, this causes (i) the coupling of the clock pin 201 to the clock input port of the I2C protocol slave logic 236 to be maintained such that the input clock signal received via the clock pin 201 is supplied to the clock input port (scl_in) of the I2C protocol slave logic 236; and (ii) the coupling of the data pin 203 to the data input port of the I2C protocol slave logic 236 and the data output port of the I2C protocol slave logic 236 to be maintained such that an input data signal received via the data pin 203 is supplied to the data input port of the I2C protocol slave logic 236 and a data signal output by the I2C protocol slave logic 236 for transmission to the I2C master device 102 is transmitted via the data pin 203.

Furthermore, the slave device 200 retains the address value programmed into the slave device at manufacture as a device address for the slave device. This is controlled by way of the value of the switch signal (I2C_PAD_SWITCH) being supplied as a control input to multiplexer 229 (shown in FIG. 4a).

When the switch signal (I2C_PAD_SWITCH) is low, the multiplexer 229 is configured to provide the address value 230 programmed into the slave device at manufacture to the I2C protocol slave logic 236 on connection 234 for use as the device address for the slave device. When the switch signal (I2C_PAD_SWITCH) is high, the multiplexer 229 is configured to provide a modified device address 232 to the I2C protocol slave logic 236 on connection 234 for use as the device address for the slave device. When the slave device 200 is connected to the I2C bus in a conventional configuration, the switch signal (I2C_PAD_SWITCH) is low thus the slave device 200 retains the address value programmed into the slave device at manufacture as a device address for the slave device.

The operation of the pad switch control module 222 will now be described with reference to when the slave device 200 is connected to the I2C bus in a cross connected configuration e.g. when the second I2C slave device 110 has the functionality of the slave device 200.

As noted above, on power-up of the slave device 200 the switching completion signal (I2C_PAD_SWITCH_DONE) and the switch signal (I2C_PAD_SWITCH) have a low value.

The adder and comparator 210 will sum the count A obtained by the first edge counter 208 and a count B obtained by the second edge counter 218 and provide a logical high value as an output to the first flip-flop 402 when this summation exceeds a predetermined threshold count.

The serial clock line 104 toggles faster than the serial data line 106. Thus when the slave device 200 is connected to the I2C bus in the cross connected configuration, then the count B obtained by the second edge counter 218 will be greater than the count A obtained by the first edge counter 208, and the comparator 220 will output a logical high value to the second flip-flop 408. The second flip-flop 408 will therefore output a logical high value.

As noted above, the output of the second flip-flop 408 is provided as control input to the multiplexer 406. In particular, when the output of the second flip-flop 408 is high, the multiplexer 406 is configured to provide the output of the nstop detection block 404 as an output of the multiplexer 406.

When the nstop detection block 404 detects the nstop condition described above. The output of the multiplexer 406 will transition from a low to high value which is provided to the second input of the AND gate 412.

The first input of the AND gate 412 will also have a high value because of the first flip-flop 402 outputting a high value once the summation of the counts exceed the predetermined threshold count. Thus when the nstop condition is detected, the output of the AND gate 412 which is provided as a clock signal to both of the third flip-flop 416 (shown as a D flip-flop) and the fourth flip-flop 418 (shown as a D flip-flop) transitions from a low to high value. This causes the value of the switching completion signal (I2C_PAD_SWITCH_DONE) to transition from a low to high value. The switch signal (I2C_PAD_SWITCH) also transitions from a low to high value due to the fact that the high output of the second flip-flop 408 is supplied to the data input of the fourth flip-flop 418.

As will be described in more detail with reference to FIG. 4b, this causes (i) the data pin 203 to be coupled to the clock input port (scl_in) of the I2C protocol slave logic 236 such that the input clock signal received via the data pin 203 is supplied to the clock input port (scl_in) of the I2C protocol slave logic 236; and (ii) the clock pin 201 to be coupled to the data input port (sda_in) of the I2C protocol slave logic 236 and the data output port of the I2C protocol slave logic 236 such that an input data signal received via the clock pin 201 is supplied to the data input port of the I2C protocol slave logic 236 and a data signal output by the I2C protocol slave logic 236 for transmission to the I2C master device 102 is transmitted via the clock pin 201.

Furthermore, the slave device 200 configures a device address for the slave device by modifying the address value programmed into the slave device. This is controlled by way of the value of the switch signal (I2C_PAD_SWITCH) being supplied as a control input to multiplexer 229 (shown in FIG. 4a).

When the slave device 200 is connected to the I2C bus in a cross connected configuration, the switch signal (I2C_PAD_SWITCH) is high and the multiplexer 229 is configured to provide a modified device address 232 to the I2C protocol slave logic 236 for use as the device address for the slave device. In particular, the slave device 200 modifies the address value programmed into the slave device at manufacture to generate a new device address for the slave device. This ensures that the second I2C slave device 110 has a unique device address as per the I2C protocol. As will be appreciated this modification can be performed in a number of different ways so that the first I2C slave device 108 and the second I2C slave device 110 have different device addresses. For example, the slave device 200 may increment the address value programmed into the slave device by an integer value (e.g. 1) to generate the new device address for the slave device. Alternatively, the slave device 200 may decrement the address value programmed into the slave device by an integer value (e.g. 1) to generate the new device address for the slave device. It will be appreciated that other modifications to the address value programmed into the slave device are also possible.

Figure 4B:
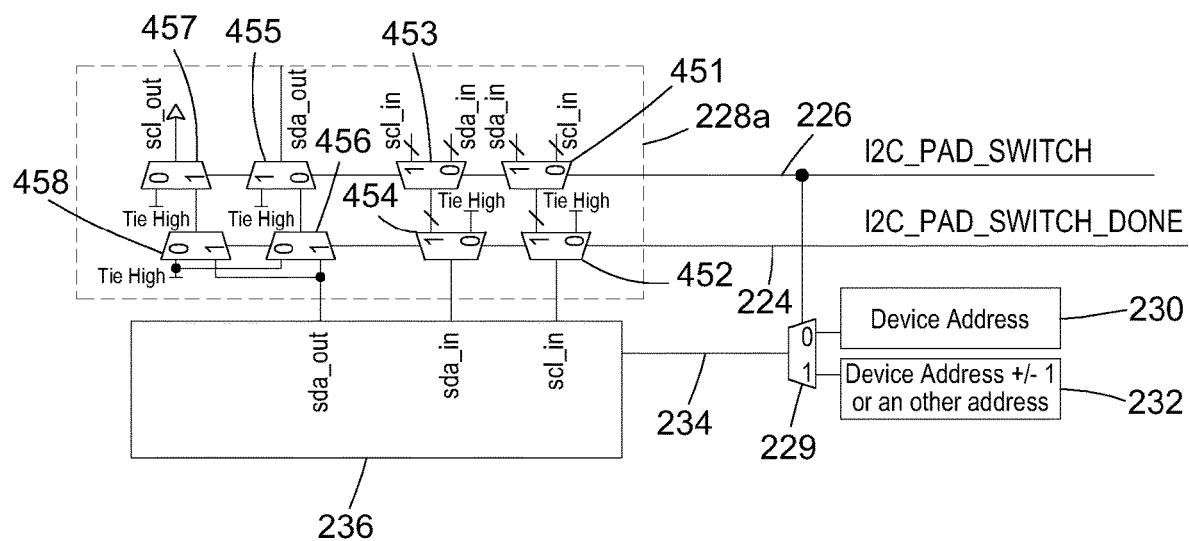
FIG. 4b illustrates a multiplexer stage of the slave device according to the first embodiment of the present disclosure.

We now describe the multiplexer stage 228a used in the slave device 200 according to the first configuration in more detail with reference to FIG. 4b.

The multiplexer stage 228a used in the slave device 200 according to the first configuration is configurable in response to both the switch signal (I2C_PAD_SWITCH) and the switching completion signal (I2C_PAD_SWITCH_DONE).

As shown in FIG. 4b, the multiplexer stage 228a receives both the switch signal (I2C_PAD_SWITCH) and the switching completion signal (I2C_PAD_SWITCH_DONE).

The multiplexer stage 228a comprises a first tier of multiplexers which has four multiplexers: multiplexer 451, multiplexer 453, multiplexer 455, and multiplexer 457. Each multiplexer in the first tier receives the switch signal (I2C_PAD_SWITCH) as a control input.

The multiplexer stage 228a also comprises a second tier of multiplexers which has four multiplexers: multiplexer 452, multiplexer 454, multiplexer 456, and multiplexer 458. Each multiplexer in the second tier receives the switching completion signal (I2C_PAD_SWITCH_DONE) as a control input.

As shown in FIG. 4b, the multiplexer 451 receives the input signal (scl_in) received via the clock pin 201 and the input signal (sda_in) received via the data pin 203. When the switch signal (I2C_PAD_SWITCH) has a low value, the multiplexer 451 outputs the input signal (scl_in) received via the clock pin 201. When the switch signal (I2C_PAD_SWITCH) has a high value, the multiplexer 451 outputs the input signal (sda_in) received via the data pin 203. The output of multiplexer 451 is coupled to an input of multiplexer 452 and the other input to multiplexer 452 is tied high. The output of multiplexer 452 is coupled to the clock input port (scl_in) of the I2C protocol slave logic 236

The multiplexer 453 receives the input signal (scl_in) received via the clock pin 201 and the input signal (sda_in) received via the data pin 203. When the switch signal (I2C_PAD_SWITCH) has a low value, the multiplexer 451 outputs the input signal (sda_in) received via the data pin 203. When the switch signal (I2C_PAD_SWITCH) has a high value, the multiplexer 451 outputs the input signal (scl_in) received via the clock pin 201. The output of multiplexer 453 is coupled to an input of multiplexer 454 and the other input to multiplexer 454 is tied high. The output of multiplexer 454 is coupled to the data input port (sda_in) of the I2C protocol slave logic 236

The data output port (sda_out) of the I2C protocol slave logic 236 is coupled to a first input of multiplexer 456 and to a first input of multiplexer 458. A second input of multiplexer 456 and a second input of multiplexer 458 are both tied high. The output of multiplexer 456 is coupled to an input of multiplexer 455 and the other input to multiplexer 455 is tied high. The output of multiplexer 455 is coupled to the input of the SDA output driver circuit 212. The output of multiplexer 458 is coupled to an input of multiplexer 457 and the other input to multiplexer 457 is tied high. The output of multiplexer 457 is coupled to the input of the SCL output driver circuit 202

As noted above, on power-up of the slave device 200 the switching completion signal (I2C_PAD_SWITCH_DONE) and the switch signal (I2C_PAD_SWITCH) have a low value.

As can be seen from FIG. 4b, the multiplexer stage 228a is arranged such that when the switching completion signal (I2C_PAD_SWITCH_DONE) is low (a first value), by default all of the slave device's internal output and input signals (to/from the I2C protocol slave logic 236) are tied to a logical high value and the switch signal (I2C_PAD_SWITCH) is prevented from configuring the multiplexer stage 228a. When the switching completion signal (I2C_PAD_SWITCH_DONE) is high (a second value), the value of the switch signal is able to configure the multiplexer stage.

When the slave device 200 is connected to the I2C bus in the conventional configuration, in response to detection of the pstop condition, the switch signal (I2C_PAD_SWITCH) remains low and the switching completion signal (I2C_PAD_SWITCH_DONE) transitions from a low to high value.

This causes:
  the input signal (scl_in) received via the clock pin 201 to be output by the multiplexer 451 and then output by the multiplexer 452 such that the input signal (scl_in) received via the clock pin 201 is supplied to the clock input port (scl_in) of the I2C protocol slave logic 236;
  the input signal (sda_in) received via the data pin 203 to be output by the multiplexer 453 and then output by the multiplexer 454 such that the input signal (sda_in) received via the data pin 203 is supplied to the data input port (sda_in) of the I2C protocol slave logic 236; and
  the data signal output from the data output port (sda_out) of the I2C protocol slave logic 236 to be output from the multiplexer 456 and then output by the multiplexer 455 such that the data signal is supplied to the data pin 203 for output on to the serial data line 106.

These changes are implemented when the I2C bus is idle (following the pstop condition detection).

When the slave device 200 is connected to the I2C bus in the cross connected configuration, in response to detection of the nstop condition, both the switch signal (I2C_PAD_SWITCH) and the switching completion signal (I2C_PAD_SWITCH_DONE) transitions from a low to high value.

This causes:
the input signal (sda_in) received via the data pin 203 to be output by the multiplexer 451 and then output by the multiplexer 452 such that the input signal (sda_in) received via the data pin 203 is supplied to the clock input port (scl_in) of the I2C protocol slave logic 236;
the input signal (scl_in) received via the clock pin 201 to be output by the multiplexer 453 and then output by the multiplexer 454 such that the input signal (scl_in) received via the clock pin 201 is supplied to the data input port (sda_in) of the I2C protocol slave logic 236; and
the data signal output from the data output port (sda_out) of the I2C protocol slave logic 236 to be output from the multiplexer 458 and then output by the multiplexer 457 such that the data signal is supplied to the clock pin 201 for output on to the serial data line 106.

These changes are implemented when the I2C bus is idle (following the nstop condition detection).

The slave device 200 according the first configuration described above requires an I2C transaction after power up to start responding to I2C transactions from the I2C master device 102 with its device address. In particular, in embodiments whereby both the first I2C slave device 108 and the second I2C slave device 110 has functionality of the slave device 200 described herein (e.g. they are multiple instances of the same slave device), after power up one I2C transaction is required for both I2C slaves devices to start responding to I2C transactions from the I2C master device 102 with its respective device address.

This required I2C transaction may for example be an I2C transaction between the I2C master device 102 and an I2C slave device connected to the I2C bus which is not part of the slave device arrangement 107 e.g. between the I2C master device 102 and the additional slave device 112. That is, the required I2C transaction is not addressed to either of the first I2C slave device 108 or the second I2C slave device 110. Alternatively, the required I2C transaction may be a dummy I2C transaction between the I2C master device 102 and the first I2C slave device 108 or the second I2C slave device 110.

When using the slave device 200 according the first configuration described above, there is no risk of any timing failure or misbehaviour of I2C protocol slave logic 236.

Figure 5A:
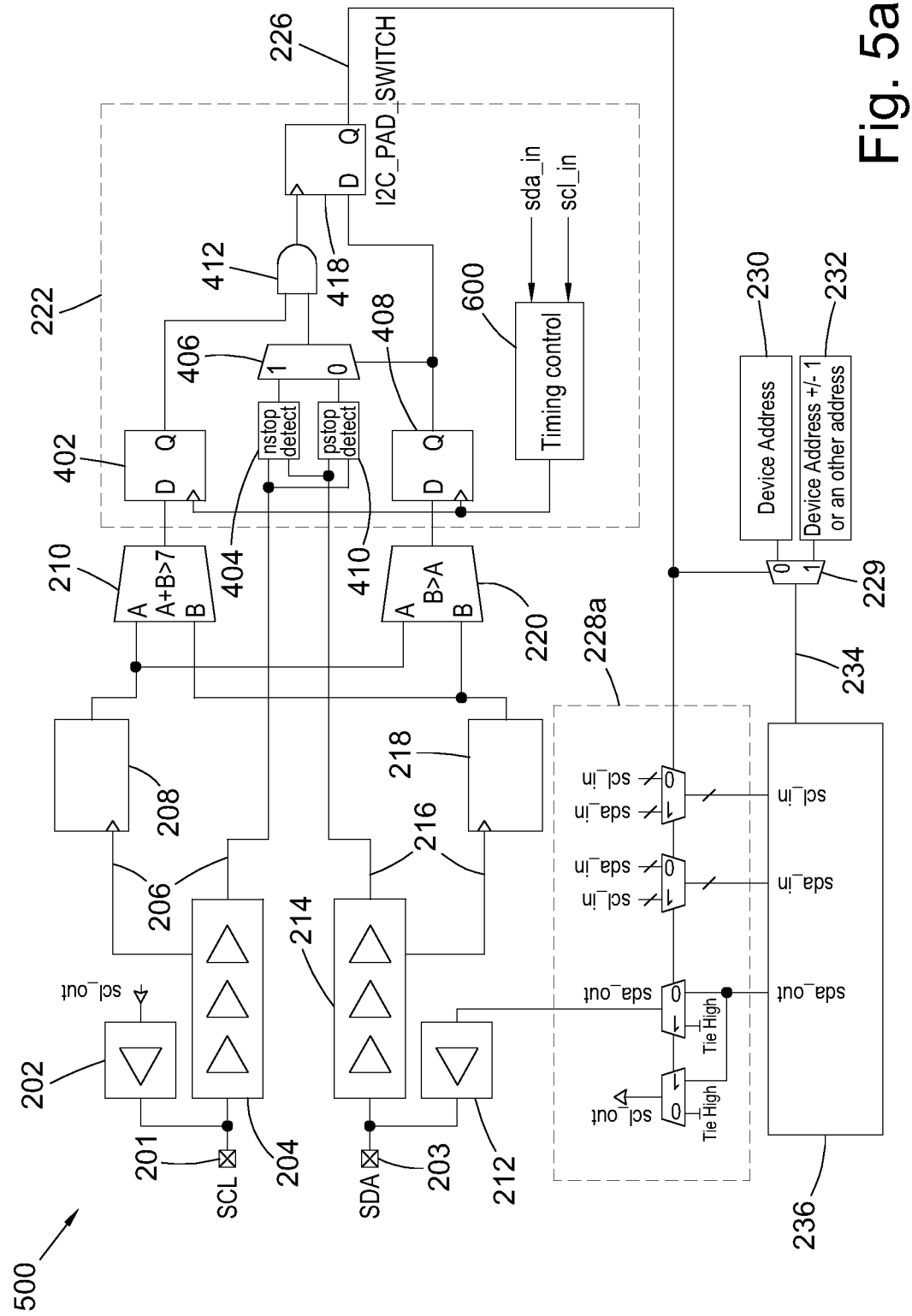
FIG. 5a illustrates a slave device according to a second embodiment of the present disclosure.

FIG. 5a illustrates an example slave device 500 according to a second configuration. With reference to FIG. 1, the second I2C slave device 110 has functionality of the slave device 500 described below. The first I2C slave device 108 may also have the functionality of the slave device 500 described below.

The example slave device 500 according to a second configuration differs from the slave device 200 described above in the implementation of the pad switch control module 222 and the multiplexer stage 228.

As shown in FIG. 5a, the output of the AND gate 412 is provided to a single flip-flop 418 (shown as a D flip-flop)—the third flip-flop 416 of the slave device 200 is not present.

In the example slave device 500, the pad switch control module 222 is configured to control the respective connections between the clock pin 201 and data pin 203 to the I2C protocol slave logic 236 by generating the switch signal (I2C_PAD_SWITCH) which is output on connection 226. In comparison to the slave device 200, a switching completion signal (I2C_PAD_SWITCH_DONE) is not output by the pad switch control module 222 according to the second configuration.

The pad switch control module 222 outputs the switch signal (I2C_PAD_SWITCH to a multiplexer stage 228b to control the coupling of the clock pin 201 and the data pin 203 of the slave device to the I2C protocol slave logic 236.

In operation, in response to a detection by the clock line identification module 205 that the data pin 203 is connected to the serial clock line 104 (i.e. the slave device is connected to the I2C bus in the cross connected configuration), the pad switch control module 222 is configured to: (i) control coupling of the data pin 203 to the clock input port (scl_in) of the I2C protocol slave logic 236 such that the input clock signal received via the data pin 203 is supplied to the clock input port (scl_in) of the I2C protocol slave logic 236; and (ii) control coupling of the clock pin 201 to the data input port (sda_in) of the I2C protocol slave logic 236 and the data output port of the I2C protocol slave logic 236 such that an input data signal received via the clock pin 201 is supplied to the data input port of the I2C protocol slave logic 236 and a data signal output by the I2C protocol slave logic 236 for transmission to the I2C master device 102 is transmitted via the clock pin 201.

That is, based on the clock line identification, the process swaps the lines going from the pins to the I2C protocol slave logic 236. That means that if the data pin 203 is connected to serial dock line 104, then pad switch control module 222 will swap the pin outputs going to the I2C protocol slave logic 236 as inputs, and the sda_out signal from the I2C protocol slave logic will be connected to the SCL output driver circuit 202.

In operation, in response to a detection by the clock line identification module 205 that the clock pin 201 is connected to the serial clock line 104 (i.e. the slave device is connected to the I2C bus in the conventional configuration), the pad switch control module 222 is configured to: maintain coupling of the clock pin 201 to the clock input port of the I2C protocol slave logic 236 such that the input clock signal received via the clock pin 201 is supplied to the clock input port (scl_in) of the I2C protocol slave logic 236; and (ii) maintain coupling of the data pin 203 to the data input port of the I2C protocol slave logic 236 and the data output port of the I2C protocol slave logic 236 such that an input data signal received via the data pin 203 is supplied to the data input port of the I2C protocol slave logic 236 and a data signal output by the I2C protocol slave logic 236 for transmission to the I2C master device 102 is transmitted via the data pin 203.

The functionality of the multiplexer stage 228b implemented in the example slave device 500 according the second configuration is described in more detail below with reference to FIG. 5b.

The multiplexer stage 228b used in the slave device 500 according to the second configuration is configurable in response to the switch signal (I2C_PAD_SWITCH) only.

The multiplexer stage 228a comprises a single tier of multiplexers which has four multiplexers, multiplexer 551, multiplexer 552, multiplexer 553, and multiplexer 554. Each multiplexer in this single tier receives the switch signal (I2C_PAD_SWITCH) as a control input.

Figure 5B:
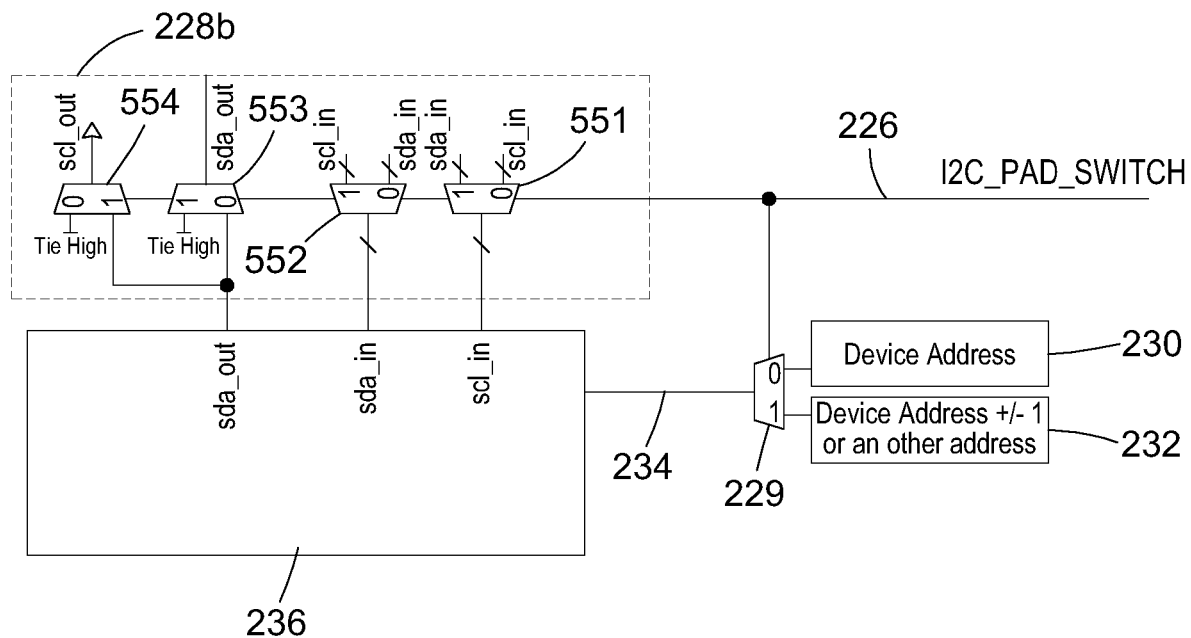
FIG. 5b illustrates a multiplexer stage of the slave device according to the second embodiment of the present disclosure.

As shown in FIG. 5b, the multiplexer 551 receives the input signal (scl_in) received via the clock pin 201 and the input signal (sda_in) received via the data pin 203. The output of multiplexer 551 is coupled to the clock input port (scl_in) of the I2C protocol slave logic 236.

The multiplexer 552 receives the input signal (scl_in) received via the clock pin 201 and the input signal (sda_in)

received via the data pin 203. The output of multiplexer 552 is coupled to the data input port (sda_in) of the I2C protocol slave logic 236.

The data output port (sda_out) of the I2C protocol slave logic 236 is coupled to a first input of multiplexer 553 and to a first input of multiplexer 554. A second input of multiplexer 553 and a second input of multiplexer 554 are both tied high. The output of multiplexer 553 is coupled to the input of the SDA output driver circuit 212. The output of multiplexer 554 is coupled to the input of the SCL output driver circuit 202.

On power-up of the slave device 500 the switch signal (I2C_PAD_SWITCH) has a low value.

This causes:
 the input signal (scl_in) received via the clock pin 201 to be output by the multiplexer 551 such that the input signal (scl_in) received via the clock pin 201 is supplied to the clock input port (scl_in) of the I2C protocol slave logic 236;
 the input signal (sda_in) received via the data pin 203 to be output by the multiplexer 552 such that the input signal (sda_in) received via the data pin 203 is supplied to the data input port (sda_in) of the I2C protocol slave logic 236; and
 the data signal output from the data output port (sda_out) of the I2C protocol slave logic 236 to be output from the multiplexer 553 such that the data signal is supplied to the data pin 203 for output on to the serial data line 106.

When the slave device 500 is connected to the I2C bus in the conventional configuration, in response to detection of the pstop condition, the switch signal (I2C_PAD_SWITCH) remains low which results in no change to the above state of the multiplexer stage 228a.

In this scenario, after power-up the slave device 500 is capable of immediately handling any I2C transaction addressed to it.

When the slave device 500 is connected to the I2C bus in the cross connected configuration, in response to detection of the nstop condition, the switch signal (I2C_PAD_SWITCH) transitions from a low to high value.

This causes:
 the input signal (sda_in) received via the data pin 203 to be output by the multiplexer 551 such that the input signal (sda_in) received via the data pin 203 is supplied to the clock input port (scl_in) of the I2C protocol slave logic 236;
 the input signal (scl_in) received via the clock pin 201 to be output by the multiplexer 552 such that the input signal (scl_in) received via the clock pin 201 is supplied to the data input port (sda_in) of the I2C protocol slave logic 236; and
 the data signal output from the data output port (sda_out) of the I2C protocol slave logic 236 to be output from the multiplexer 554 such that the data signal is supplied to the clock pin 201 for output on to the serial data line 106.

In this scenario, after power-up the slave device 500 requires an I2C transaction after power up to start responding to I2C transactions from the I2C master device 102 with its device address. In particular, in embodiments whereby both the first I2C slave device 108 and the second I2C slave device 110 has functionality of the slave device 200 described herein (e.g. they are multiple instances of the same slave device), after power up one I2C transaction is required for both I2C slaves devices to start responding to I2C transactions from the 120 master device 102 with its respective device address. As explained above, this required 120 transaction may for example be an I2C transaction between the I2C master device 102 and an I2C slave device connected to the I2C bus which is not part of the slave device arrangement 107 or a dummy I2C transaction between the I2C master device 102 and the first I2C slave device 108 or the second I2C slave device 110.

The I2C protocol slave logic 236 of the slave device 500 according to the second configuration should be designed carefully to take care of timing violations. In particular, in the cross connected configuration, the clock input port (scl_in) of the I2C protocol slave logic 236 will receive data from the serial data line 106. Similarly, the data input port (sda_in) of the I2C protocol slave logic 236 will receive a clock signal from the serial clock line 104. Due to this interchanged relationship, the I2C protocol slave logic 236 should be designed so as not to get into an unwanted state.

In both the slave device 200 according to the first configuration and the slave device 500 according to the second configuration, the first flip-flop 402 and the second flip-flop 408 are driven by the same clock signal. This clock signal may be provided by timing logic 600, an example of which is shown in FIG. 6.

Given that the input of each of the first flip-flop 402 and the second flip-flop 408 is controlled based on both the input signal (scl_in) received via the clock pin 201 and the input signal (sda_in) received via the data pin 203 (i.e. clock and data signals regardless of how the slave device is connected to the I2C bus) the timing logic 600 is provided to meet the timing requirements of the first flip-flop 402 and the second flip-flop 408.

Figure 6:
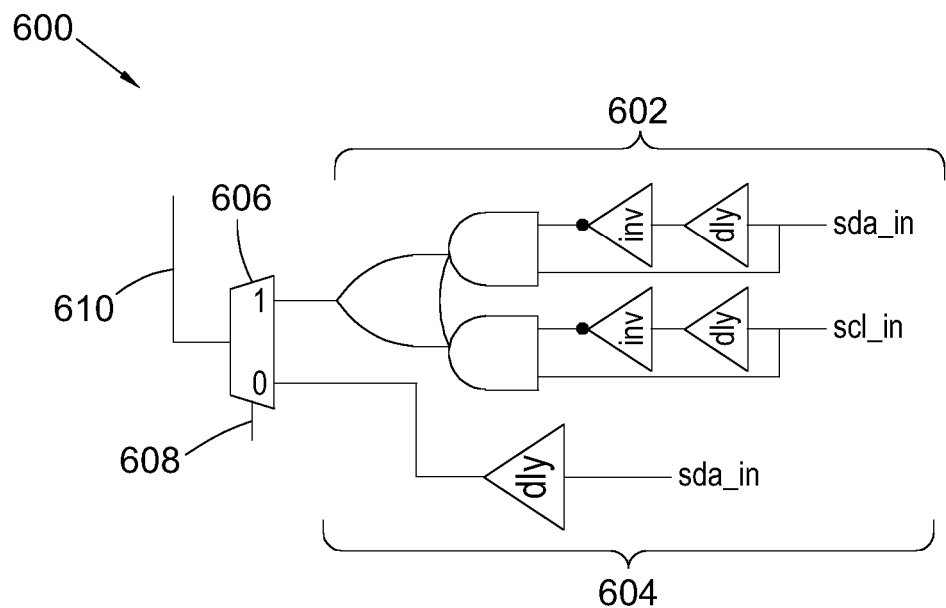
FIG. 6 illustrates example timing logic.

FIG. 6 shows one way that the timing logic 600 may implemented however other implementations are possible. The example timing logic 600 shown in FIG. 6 receives as inputs the input signal (scl_in) received via the clock pin 201 and the input signal (sda_in) received via the data pin 203. In a first branch 602, the input signal (sda_in) is inverted and delayed before being supplied as a first input to a first AND gate, the first AND gate also receives the input signal (sda_in) as a second input. In the first branch 602, the input signal (scl_in) is inverted and delayed before being supplied as a first input to a second AND gate, the second AND gate also receives the input signal (scl_in) as a second input. The output of the first AND gate and the second AND gate are supplied as respective inputs to an OR gate the output of which is provided as a first input to a multiplexer 606. In a second branch 604 the input signal (sda_in) received via the data pin 203 is delayed and supplied as a second input to the multiplexer 606. The multiplexer 606 is controlled via the control signal 608. That is, the output of the multiplexer 606 will be the output of the first branch 602 or the output of the second branch 604 in dependence on the value of the control signal 608. The multiplexer 606 may be a one-time programmable device. The multiplexer 606 output is provided on connection 610 to the clock input of the first flip-flop 402 and the second flip-flop 408.

In operation, there are two possibilities for clock generation selected by the control signal 608. When 608=0, the delayed sda_in signal is used as clock so that the D input of the first flip-flop 402 and the second flip-flop 408 gets settled before its clock reaches it clock pin, to take care of setup/hold timing violation of the flip-flops.

Figure 7:
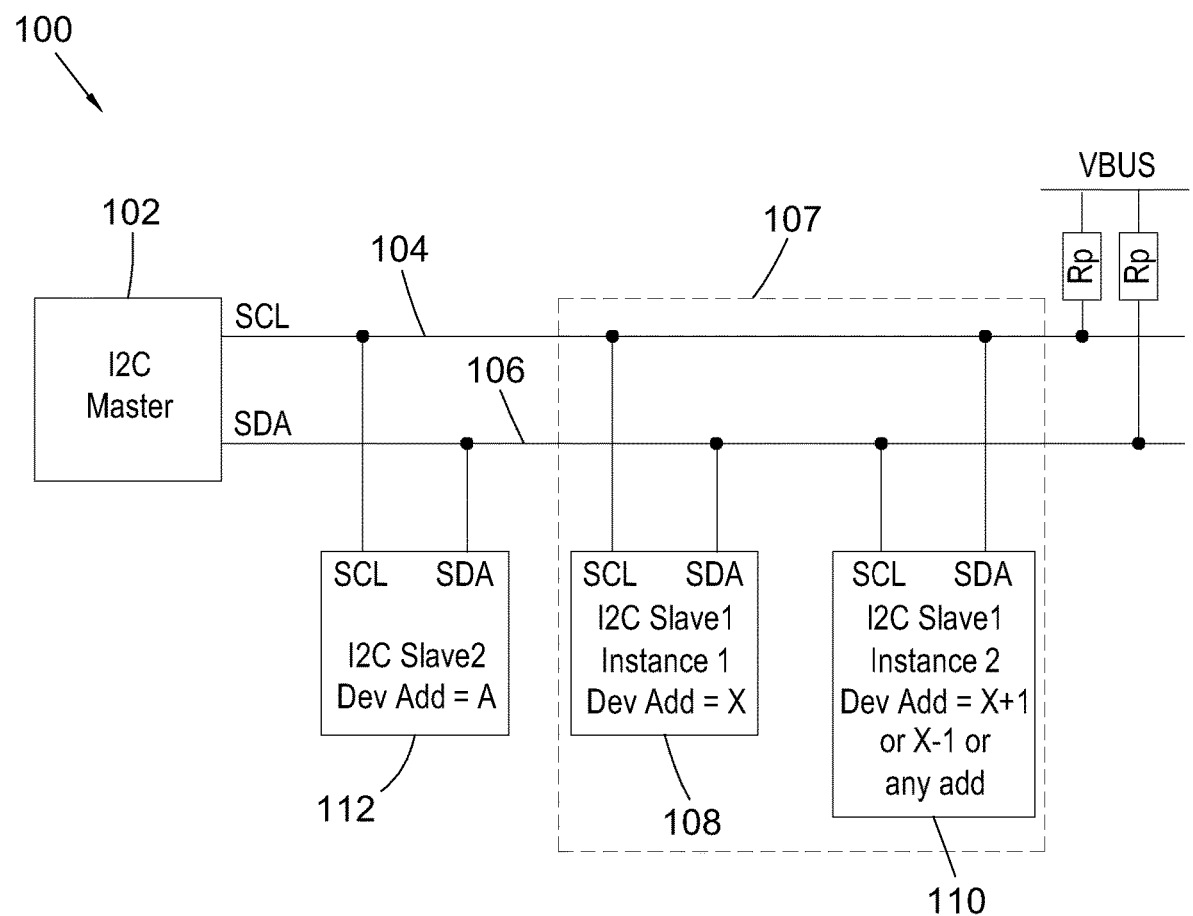
FIG. 7 illustrates a schematic block diagram of the Inter-Integrated Circuit (I2C) apparatus after an I2C transaction according to embodiments of the present disclosure.

When 608=1, the same delay concept explained above is used to avoid setup/hold timing but with added pulse generation. In this case any low-high transition on scl-in or sda_in signal generates a clock pulse for the first flip-flop 402 and the second flip-flop 408. FIG. 7 illustrates a schematic block diagram of the I2C apparatus 100 after an I2C transaction.

After some I2C transaction not addressed to the first I2C slave device 108 and the second 120 slave device 110 (in this example, instances of the same slave device) or a dummy 120 transaction (if no other slave devices are connected to I2C bus), pad swapping detection will complete. The first I2C slave device 108 connected to the I2C bus in the conventional configuration (slave1 instance 1) will retain its default address. But the second I2C slave device 110 (slave1 instance 2) pins are swapped so the logic in it will detect this scenario and modify the address value programmed into the second I2C slave device as shown in FIG. 7.

The techniques described in the present disclosure can be used in various applications. For example, in commercial mobile business, wireless ear buds will have a requirement of connecting two I2C slave devices to the same I2C bus. The present disclosure can be applied to any application in which two slave devices (e.g. two instances of the same slave device) need to be connected on the same I2C bus.

Whilst embodiments have been described herein with reference to one or more of the slave devices having dedicated hardware circuitry any of the functionality of a slave device described herein can be implemented using software, firmware, hardware (e.g., fixed logic circuitry), or a combination of these implementations. The terms "module" "functionality", "stage", "block" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in any embodiments, whether alone or in any appropriate combination with any other feature disclosed or illustrated herein.

LIST OF REFERENCE NUMERALS

100 Inter-Integrated Circuit (I2C) apparatus
102 I2C master device 102
104 serial clock line
106 serial data line
107 slave device arrangement
108 first I2C slave device
110 second I2C slave device
112 additional slave device
200 slave device according to a first configuration
201 clock pin
202 SCL output driver circuit 202
203 data pin
204 SCL pad delay and filter circuit
205 clock line identification module
206 connection
208 first edge counter
210 adder and comparator
212 SDA output driver circuit
214 SDA pad delay and filter circuit
216 connection
218 second edge counter
220 comparator
222 pad switch control module
224 connection
226 connection
228a multiplexer stage of the slave device according to the first configuration
228b multiplexer stage of the slave device according to the second configuration
229 multiplexer
230 address value programmed into the slave device at manufacture
232 modified device address
234 connection
236 I2C protocol slave logic
300 I2C transaction seen by pins of a slave device connected to the I2C bus in a conventional configuration
302 signal received on the data pin
304 signal received on the clock pin
306 positive start condition
308 negative start condition
310 negative stop condition
312 positive stop condition
350 I2C transaction seen by pins of a slave device connected to the I2C bus in a cross connected configuration
402 first flip-flop
404 nstop detection block
406 multiplexer
408 second flip-flop
410 pstop detection block
412 AND gate
416 third flip-flop
418 fourth flip-flop
451 multiplexer
452 multiplexer
453 multiplexer
454 multiplexer
456 multiplexer
457 multiplexer
458 multiplexer
500 slave device according to a second configuration
551 multiplexer
552 multiplexer
553 multiplexer
554 multiplexer
600 timing logic
602 first branch
604 second branch
606 multiplexer
608 control signal
610 connection

The invention claimed is:

1. An Inter-Integrated Circuit, I2C, apparatus comprising:
an I2C master device; and
a first I2C slave device communicably connected with the master device through an I2C bus comprising a serial clock line and a serial data line, wherein a clock pin of the first slave device is connected to the serial clock line and a data pin of the first slave device is connected to the serial data line;

a second I2C slave device communicably connected with the master device through the I2C bus, wherein a clock pin of the second I2C slave device is connected to the serial data line and the data pin of the second I2C slave device is connected to the serial clock line; wherein an address value programmed into the first I2C slave device is the same as an address value programmed into the second I2C slave device;

wherein the second I2C slave device comprises:

processing logic comprising a clock input port, a data input port and a data output port;

a clock line identification module configured to detect whether the clock pin or the data pin of the second I2C slave device is connected to the serial clock line, the clock line identification module comprising:
- a first edge counter configured to count edges of a signal received via the clock pin of the second I2C device; and
- a second edge counter configured to count edges of a signal received via the data pin of the second I2C device; wherein once a summation of a first count by the first edge counter and a second count by the second edge counter exceeds a predetermined threshold count, the clock line identification module is configured to detect whether the clock pin or the data pin of the second I2C device is connected to the serial clock line by comparing the first count and the second count; and a control module configured, in response to a detection that the data pin is connected to the serial clock line, to:
- control coupling of the data pin of the second I2C slave device to the clock input port of said processing logic;
- control coupling the clock pin of the second I2C slave device to the data input port of said processing logic and a data output port of said processing logic; and
- configure a device address for the second I2C slave device by modifying the address value programmed into the second I2C slave device.

2. The I2C apparatus according to claim 1, wherein the control module is configured, in response to a detection that the clock pin of the second I2C slave device is connected to the serial clock line, to:
- maintain coupling of the clock pin of the second I2C slave device to the clock input port of said processing logic;
- maintain coupling of the data pin of the second I2C slave device to the data input port of said processing logic and a data output port of said processing logic; and
- retain the address value programmed into the second I2C slave device as a device address for the second I2C slave device.

3. The I2C apparatus according to claim 1, wherein the clock line identification module is configured to:
- detect that the data pin of the second I2C device is connected to the serial clock line based on the second count exceeding the first count; and
- detect that the clock pin of the second I2C device is connected to the serial clock line based on the first count exceeding the second count.

4. The I2C apparatus according to claim 1, wherein the second I2C slave device further comprises:
- a multiplexer stage coupling said clock pin and said data pin of the second I2C device to the processing logic, wherein the control module is configured to generate and transmit a switch signal to the multiplexer stage to control the coupling of the data pin and clock pin of the I2C slave device to the processing logic, the switch signal having a value dependent on whether the clock pin or the data pin of the device is connected to the serial clock line.

5. The I2C apparatus according to claim 4, wherein in response to a detection that the clock pin of the second I2C device is connected to the serial clock line, the control module is configured to generate and transmit the switch signal having a first value to configure the multiplexer stage so that the clock pin of the second I2C device is coupled to the clock input port of said processing logic and the data pin of the second I2C device is coupled to the data input port and the data output port of said processing logic.

6. The I2C apparatus according to claim 4, wherein in response to the detection that the data pin of the second I2C device is connected to the serial clock line, the control module is configured to generate and transmit the switch signal having a second value to configure the multiplexer stage so that the data pin of the second I2C device is coupled to the clock input port of said processing logic and the clock pin of the second I2C device is coupled to the data input port and the data output port of said processing logic.

7. The I2C apparatus according to claim 6, wherein the control module is configured to detect that the I2C bus is idle and generate and transmit said switch signal having the second value in response to detecting that the I2C bus is idle.

8. The I2C apparatus according to claim 7, wherein when the data pin of the second I2C device is connected to the serial clock line the control module is configured to detect that the I2C bus is idle by detecting a transition of the signal received via the clock pin from a logic low value to a logic high value whilst the signal received via the data pin is at logic high value.

9. The I2C apparatus according to claim 7, wherein when the clock pin of the second I2C device is connected to the serial clock line the control module is configured to detect that the I2C bus is idle by detecting a transition of the signal received via the data pin from a logic low value to a logic high value whilst the signal received via the clock pin is at logic high value.

10. The I2C apparatus according to claim 4, wherein the control module is configured to:
- generate a switching completion signal; and
- transmit the switching completion signal to the multiplexer stage, wherein the multiplexer stage is configurable in response to both the switch signal and the switching completion signal.

11. The I2C apparatus according to claim 10, wherein the multiplexer stage is arranged such that when the switching completion signal has a first value, the switch signal is prevented from configuring the multiplexer stage, and when the switching completion signal has a second value, the switch signal is able to configure the multiplexer stage.

12. The I2C apparatus according to claim 11, wherein the multiplexer stage ties the clock input port, data input port, and data output port to a default logic high value until the switching completion signal has said second value which allows the switch signal to configure the multiplexer stage.

13. The I2C apparatus according to claim 10, wherein the multiplexer stage is configured in response to only the switch signal.

14. The I2C apparatus according to claim 1, wherein the control module is configured to modify the address value programmed into the second I2C slave device by incrementing or decrementing the address value.

15. An Inter-Integrated Circuit, I2C, apparatus comprising:
- an I2C master device; and
- a first I2C slave device communicably connected with the master device through an I2C bus comprising a serial clock line and a serial data line, wherein a clock pin of the first slave device is connected to the serial clock line and a data pin of the first slave device is connected to the serial data line;
- a second I2C slave device communicably connected with the master device through the I2C bus, wherein a clock pin of the second I2C slave device is connected to the serial data line and the data pin of the second I2C slave device is connected to the serial clock line; wherein an address value programmed into the first I2C slave device is the same as an address value programmed into the second I2C slave device;
- wherein the second I2C slave device comprises:
- processing logic comprising a clock input port, a data input port and a data output port;
- a clock line identification module configured to detect whether the clock pin or the data pin of the second I2C slave device is connected to the serial clock line; and
- a control module configured, in response to a detection that the data pin is connected to the serial clock line, to:
  - control coupling of the data pin of the second I2C slave device to the clock input port of said processing logic;
  - control coupling the clock pin of the second I2C slave device to the data input port of said processing logic and a data output port of said processing logic;
  - configure a device address for the second I2C slave device by modifying the address value programmed into the second I2C slave device; and
  - modify the address value programmed into the second I2C slave device by incrementing or decrementing the address value.

* * * * *